United States Patent [19]

MacDonald

[11] 4,268,034
[45] May 19, 1981

[54] BOWLING BALL

[75] Inventor: Gene W. MacDonald, Kent, Ohio

[73] Assignee: GMSG, Inc., Kent, Ohio

[21] Appl. No.: 19,823

[22] Filed: Mar. 12, 1979

Related U.S. Application Data

[63] Continuation-in-part of Ser. No. 814,625, Jul. 11, 1977, abandoned, which is a continuation of Ser. No. 605,388, Aug. 18, 1975, abandoned.

[51] Int. Cl.³ .............................................. A63B 37/14
[52] U.S. Cl. ................................ 273/63 C; 273/63 E; 273/63 G; 40/327; 264/299
[58] Field of Search ................ 273/63 R, 63 C, 63 D, 273/63 E; 40/327

[56] References Cited

U.S. PATENT DOCUMENTS

| | | | |
|---|---|---|---|
| 3,270,108 | 8/1966 | Randolph | 273/63 G X |
| 3,318,598 | 5/1967 | Ruskin | 273/63 C |
| 4,121,828 | 10/1978 | Amburgey | 273/63 C X |

Primary Examiner—George J. Marlo
Attorney, Agent, or Firm—Hamilton, Renner & Kenner

[57] ABSTRACT

A bowling ball according to one embodiment of the present invention has a hollow member, or a member of less specific gravity than the mass of the bowling ball, disposed therein with its centroid displaced from the geometric center of the ball. The lighter weight member in the ball permits the use of a dense polymerizable composition for the basic mass of the ball. The ball is molded without the usual shell so that it has a resilient striking surface for maximum impact and pin carry. In another embodiment, a member of a higher specific gravity than that of the polymerizable mass is added generally on the same axis as the lighter weight member to increase the eccentricity of the ball and give it even more driving power upon impact with the pins. The member of higher specific gravity may be provided with pin members extending therefrom to the surface of the ball. These pin members not only determine the depth of the member of higher specific gravity but they also provide a visual indication of the location and orientation of the same.

4 Claims, 8 Drawing Figures

BOWLING BALL

RELATED APPLICATIONS

This application is a continuation-in-part of my prior, co-pending application Ser. No. 814,625 filed July 11, 1977, now abandoned, which was in turn a continuation of Ser. No. 605,388 filed Aug. 18, 1975 and now abandoned.

BACKGROUND OF THE INVENTION

This invention relates generally to bowling balls and more particularly to a novel bowling ball adapted to travel a curvilinear path and having a larger area of maximum hitting force than previously available balls. The invention also provides a method for making the novel and improved bowling ball.

Bowling balls used in competitive sports events must conform to specifications of the American Bowling Congress. The ball cannot weigh more than 16 pounds and must have a circumference of about 27 inches. The ball is provided with appropriately spaced finger holes for reception of the thumb, middle finger and an adjacent finger. These finger holes are drilled in the "top" of the ball. The top weight of the ball must be within three ounces of the bottom weight and the side weights must be within one ounce of each other. The more skillful bowlers roll the ball so that it enters the pin placement at an angle with respect to the longitudinal axis of the bowling lane or alley. This requires that the ball be following a curved path as it strikes the pins and provides for maximum "pin carry". It is known that top weight, which provides a positive off-balance at the finger holes, assists the bowler in rolling a curve or hooked ball. The better bowlers repeatedly roll the first ball of a frame along substantially the same path with adjustments based on changing lane conditions. Theoretically the ball should strike the "pocket" each time at essentially the same angle with respect to the longitudinal axis of the pin placement and with the top weighted point of the ball striking the pins. If the roll is perfectly executed, all ten pins will be knocked down on each roll. However, if there is a departure in form, the ball might not curve at the expected angle or might not rotate so that the pins are struck with the maximum impact.

The conventional bowling ball is provided with a top weight insert generally at the location of the finger holes. This is the point that should strike the pins for maximum effect. It has been proposed in U.S. Pat. No. 3,350,252 to provide this top weight by including in the core of a bowling ball a foam plastic insert spaced radially outwardly from the center of the external shell in the bottom of the ball. The point of top weight of the ball is marked on the surface so that finger holes can be properly located. The point of mass concentration of the ball will theoretically be the same from ball to ball if the location of the insert is the same. The foam insert has a disadvantage that it has an irregular surface of open cells and webbing between the cells. The polymerizable plastic mass used to mold the ball about the insert will enter the cells and produce an irregular interface between insert and ball body which along with the variation in density will result in an irregular distribution of weight. The net result will be that the point of mass concentration will vary from ball to ball. Such variance will be accentuated in lighter weight balls where larger foam inserts are required because of the larger exposed area.

A bowling ball having a solid top weight substantially less than a hemisphere placed in the top half of the ball closely adjacent to the midplane is disclosed in U.S. Pat. No. 3,865,369. The density of the insert is substantially greater than that of the body of the ball which makes it undesirably necessary to use a relatively low density resin for the body.

A bowling ball having a solid wood or metal insert disposed about the geometric center of the ball is disclosed in U.S. Pat. No. 575,128. This ball allegedly rolls noiselessly along the lane. A bowling ball having a shell enclosing a hollow center with the inner wall concentric with the outer surface of the ball is disclosed in U.S. Pat. No. 3,256,018. The shell is formed of a plurality of cast layers of resin. Such balls do not provide for maximum "pin carry" and are not designed to facilitate curving or hooking of the ball.

No matter what configuration or composition, all bowling balls, of which I am aware, are manufactured in a reusable, usually two-piece metallic mold. Such a procedure not only requires a great deal of capital expenditure for mass production purposes but also is susceptible to material waste due to leakage between the mold halves. If great enough, leakage may also result in a scrap ball because voids are formed beneath the surface of the ball. In addition, accelerated curing with microwaves is not feasible with a metallic mold since the microwave energy would be substantially absorbed by the metal itself.

Finally, in balls provided with top weights, usually what can be called the "aspect ratio" of the weight, that is, the ratio of its length to its width, is unity. While providing eccentricity, this concentration of weight can often provide an uneven noncentroidal rolling or "loping" which, if carefully analyzed, could be said to be rolling with periods of acceleration followed by periods of deceleration due to the momentum of the weight. Thus, it is desirable, if providing a top weight, to avoid this uneven rolling. Such noncentroidal rotation can be further complicated if the finger and thumb holes are not properly positioned in the ball. The driller of the ball cannot, by looking at the ball, always determine the precise location or orientation of the top weight. Usually this is accomplished by a balancing procedure which does not always lend itself to consistent results.

SUMMARY OF THE INVENTION

It is thus a primary object of the present invention to provide a bowling ball which will impact the pins with a greater hitting strength despite inconsistencies in the rolling thereof by the bowler.

It is another object of the present invention to provide a bowling ball, as above, with induced eccentricities therein enabling the ball to be more readily rolled in the desired curvilinear path.

It is a further object of the present invention to provide a bowling ball, as above, with induced eccentricity highly concentrated in the track area thereby rolling with greater movement of inertia to provide less deflection on impact with the pins.

It is yet another object of the present invention to provide a bowling pin, as above, with a top weight having an aspect ratio greater than unity and positioned to eliminate uneven rolling of the ball.

It is still another object of the present invention to provide a bowling ball, as above, with a means of identifying the location and orientation of the top weight to aid in the precise placement of the ideal location for the finger and thumb holes.

It is an additional object of the present invention to provide a bowling ball which is manufactured by a unique inexpensive process including the use of a disposable plastic mold.

These and other objects of the present invention, which will become apparent from the description to follow, are accomplished by the means hereinafter described and claimed.

In general, a bowling ball is made in a disposable mold by first placing a member in the mold and then filling the mold with a polymerizable mass. The member has a specific gravity less than the polymerizable mass and is located in the ball such that its centroid will be in the range of from three to six and one-half inches from a point of reference on the surface of the bowling ball. A weight block of specific gravity higher than the mass is then suspended in the mass to a depth in the range of one-half inch to three and one-quarter inches from the point of reference and generally on the same axis as the member. After polymerization of the mass, the mold is ground away and the mass is formed into the finished bowling ball.

DESCRIPTION OF THE PREFERRED EMBODIMENTS

Figure 1:
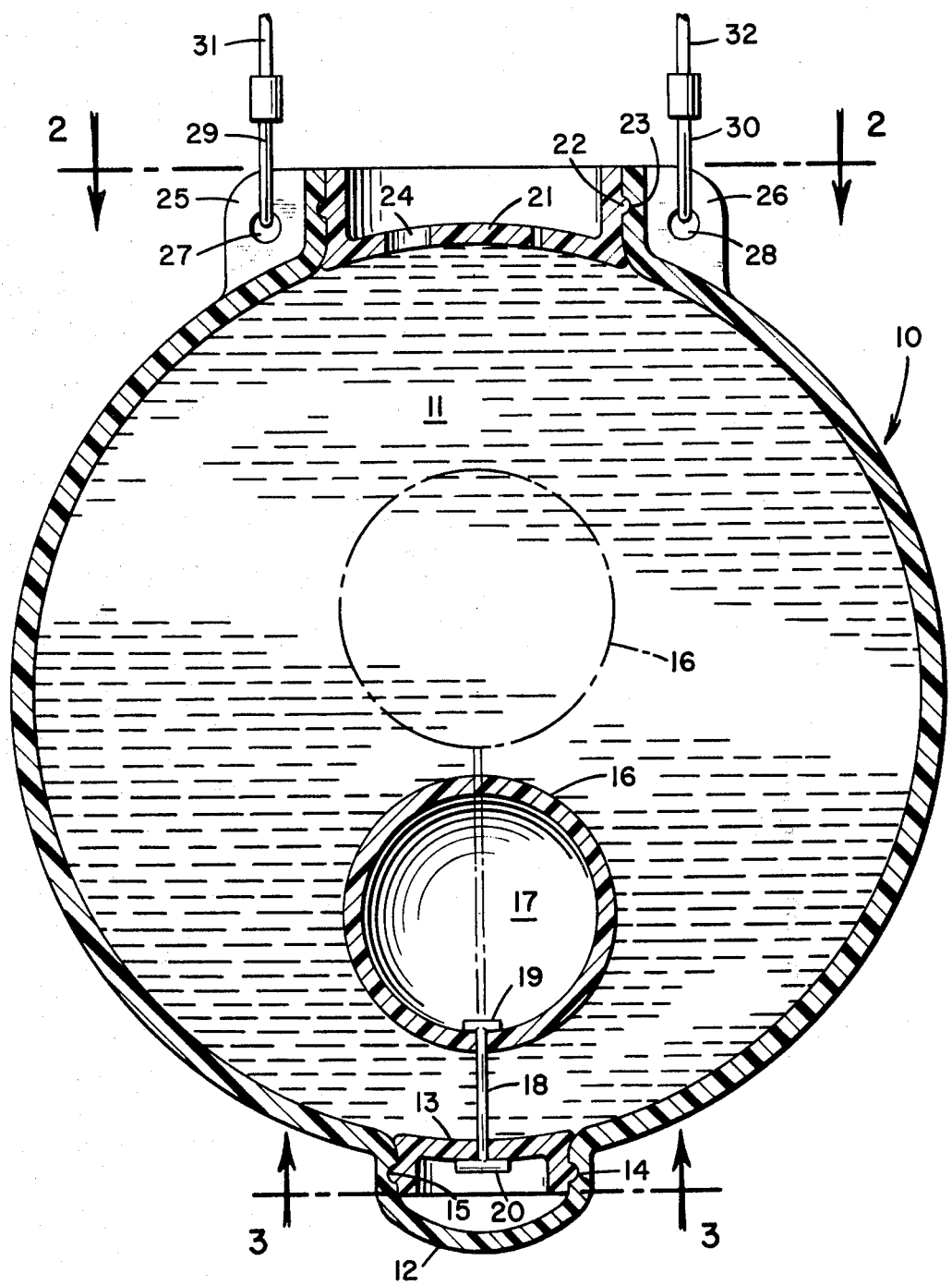
FIG. 1 is a cross-section of a mold and polymerizable mass illustrating one embodiment of the invention.
Figure 2:
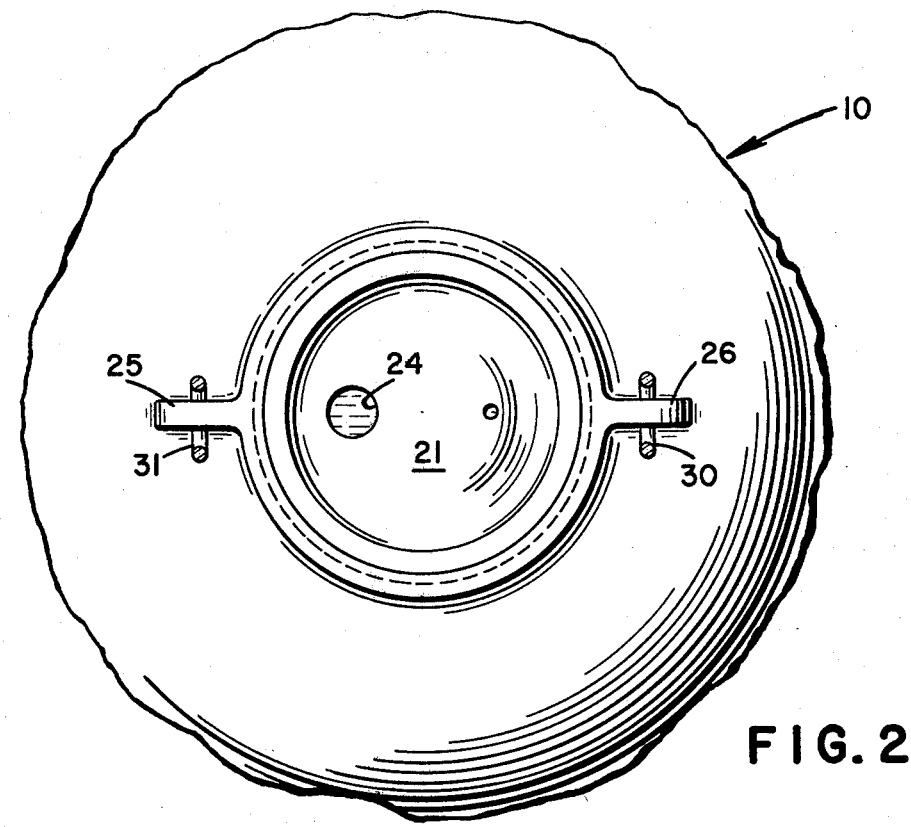
FIG. 2 is a fragmentary plan view taken substantially along line 2—2 of FIG. 1.
Figure 3:
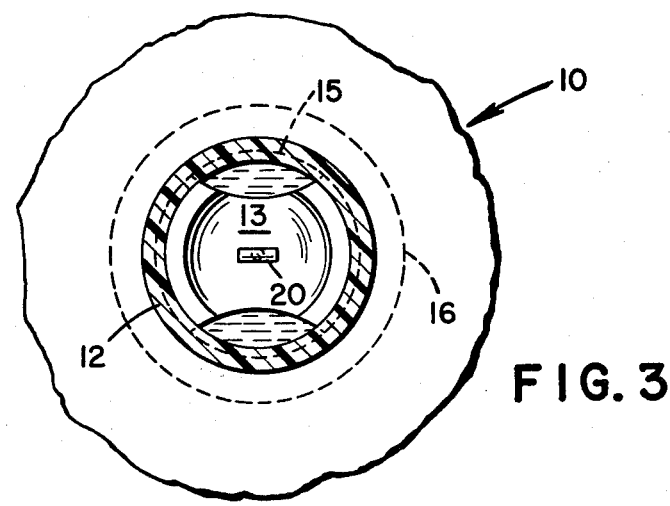
FIG. 3 is a bottom view taken substantially along line 3—3 of FIG. 1.
Figure 5:
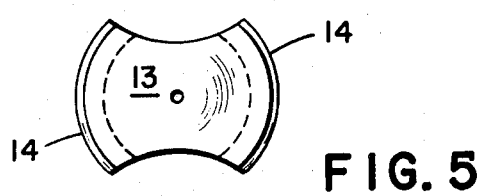
FIG. 5 is a plan view of the supporting member for the hollow insert.

One embodiment of a mold 10 suitable for shaping a polymerizable material 11 into a generally spherical shape somewhat larger than the circumference desired for the bowling ball is illustrated in FIG. 1. Mold 10 is a disposable member molded out of polyethylene, polypropylene, or the like. Mold 10 has spherical walls integral with a cup-shaped protuberant member 12 at the bottom of the mold. A supporting member 13 is locked in the cup-shaped member 12 by means of annular flange 14 embedded in an annular groove 15 in the inner wall of the cup-shaped member 12. As illustrated in FIG. 5, support member 13 does not completely close the opening to cup-shaped member 12 so that any heavy material included in the moldable composition 11 can settle out of the body portion of the ball. The inner surface of member 13 is arcuate shaped to continue the spherical surface of the mold cavity.

A ball 16 having a cavity 17 is disposed in the cavity of mold 10 and held in place by means of a nylon string 18 having a parallelepiped-shaped member 19 on one end and a parallelepiped shaped member 20 on the other end. Ball 16 is eccentrically disposed in the mold cavity and may be on either side of the geometric center of the mold cavity and of the resulting molded ball. A "buttoneer" sold by Dennison Manufacturing Company, Farmingham, Massachusetts, may be used as member 18 for the support of ball 16 in the cavity. The "buttoneer" prevents ball 16 from floating freely in the polymerizable mass 11 and at the same time provides a convenient means for exactly locating the ball 16 in the finished bowling ball by varying the length of string 18 or the like.

A polymerizable mass is then poured into the mold 10 to fill the cavity about ball 16. The mass may be supplied from two tanks, one preferably having resin, filler, pigment and a catalyst and the other preferably having resin, filler, pigment and a promoter, to a mixing head for injection into the mold.

Any suitable synthetic resinous composition may be used such as, for example, the polymerizable compositions disclosed in U.S. Pat. Nos. 3,059,007; 3,353,825; 3,350,252; 3,248,113; 3,256,018 and 3,318,727. The polymerizable composition may be free from filler if the desired weight can be obtained or, as is preferred, it may contain a suitable inorganic particulate filler such as, for example, litharge, talc, barytes, calcium carbonate, silica, kaolin clay, or the like when needed for higher density. Conversely, glass bubbles, hollow silica spheres or any such material having a lesser density may be used as needed for lighter weight balls. A preferred composition is a polyester resin prepared by mixing an ethylenically unsaturated polyester and styrene with an initiator and a suitable filler such as the polyester resin disclosed in U.S. Pat. No. 3,318,727 and the compositions of U.S. Pat. Nos. 3,068,007 and 3,256,018. A coupling agent such as an aminosilane, or any other suitable silane such as a mercapto silane, may be used to impart greater durability with any filler containing $SiO_2$ functionality such as kaolin clay, silica flour or the like. Aminosilanes are preferred if the synthetic resin is a polyester resin because it is more compatible than the others and provides better cross-linking. A suitable aminosilane is n-$\beta$(aminoethyl)-$\gamma$-aminopropyltrimethoxysilane sold by Union Carbide as No. A1120. The coupling agent may be mixed with filler prior to its incorporation in the resinous composition or the filler and coupling agent may be added separately to the composition before it solidifies. The use of the coupling agent with the filler in the resinous composition improves the durability and resilience of the resulting bowling ball. Any other suitable coupling agent such as isopropyl triisostearic titanate may be used.

An organic polyisocyanate coupling agent may be used with any filler containing reactive hydrogen determinable by the Zerewitinoff method and reactive with —NCO groups, such as tolylene diisocyanate, diphenyl methane diisocyanate or other suitable polyisocyanate disclosed by Saunders and Frisch *Polyurethane: Chemistry and Technology* published by Interscience Publishers. For example, such a coupling agent may be used to advantage with a carbon black filler, nitrile rubber or other material.

The aminosilane coupling agent will, of course, inpart increased durability and resilience to a bowling ball whether it has a void or not. Hence, in its broader aspects the invention contemplates a bowling ball free from voids molded from a polymerizable mass containing one of the above fillers having $SiO_2$ functionality and an aminosilane or other suitable coupling agent which will react chemically with the filler and couple it to the polymerizable mass. Suitable chemically modified fillers are the "NULOK" and "NUCAP" series of kaolin clay fillers containing an aminosilane or mercaptosilane, respectively, for coupling the filler with the polymerizable mass. These materials are available from J. M. Huber Corporation of Edison, New Jersey.

While any suitable polyester may be used for the polymerizable mass, it is preferred to use a flexible polyester prepared from iso-phthalic or ortho-phthalic acid and diethylene glycol, butylene glycol or the like. The hardness of the bowling ball can be varied between a Shore D of 50-100 by selection of the polyester. Blends of rigid and flexible polyesters may be used for this purpose.

With the mold so filled, a cap 21 is then inserted in the opening in the mold and wedged into place by means of an annular ring 22 embedded in an annular groove 23 in the wall of mold 10. Additional polymerizable material may be added through opening 24 to completely fill the mold cavity. The inner surface of cap 21 is arcuate shaped to continue the curved surface of the mold cavity. Ears 25 and 26 having openings 27 and 28 therein are provided for suspending mold 10 by means of hooks 29 and 30 and cords or chains 31 and 32 until the composition in the mold has solidified and cured. Cords 31 and 32 may be tied together for suspension from a single point for the precision centering of the ball 16, as desired, during curing. Curing may be accelerated by heating, if desired, but normally such will not be necessary. In addition, cure systems totally dependent on heat as an initiator, such as cumene hydroperoxide, can be used in conjunction with microwave excitation. The plastic mold permits such microwave usage which may be desirable since it heats the polar polyester resin more evenly throughout than other forms of heating.

Figure 4:
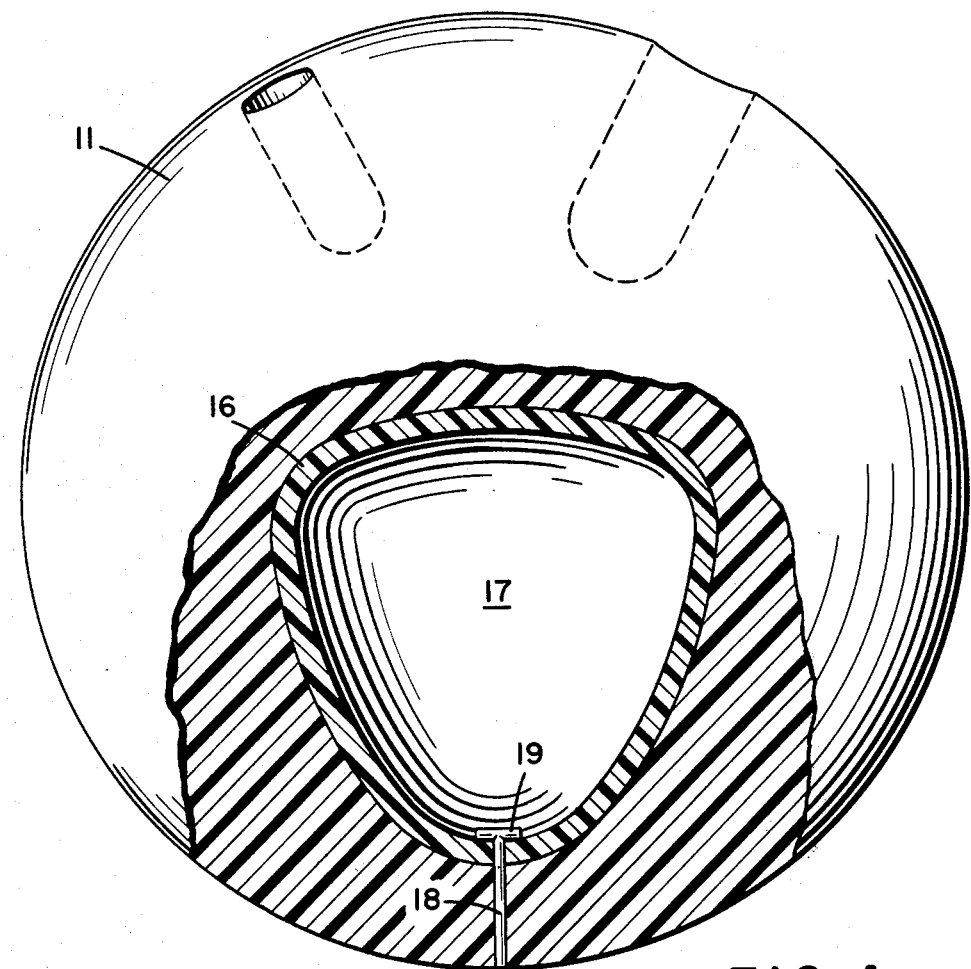
FIG. 4 is an elevation, partially in section, of an alternative embodiment of the bowling ball according to the present invention.

Although the member 16 has been shown as spherical, it may have any other conventional shape, such as, cubic, ellipsoidal, hemispherical or the like. A ball with a generally conically shaped member 16 is shown in FIG. 4. Such cavities are advantageous in light weight balls because larger cavities can be used and still leave suffient solid mass for drilling the finger holes without puncturing the cavity. The larger cavities also have the advantage that the density of the resin may be made greater by the addition of a filler to improve the striking force by increasing the moment of inertia.

Figure 6:
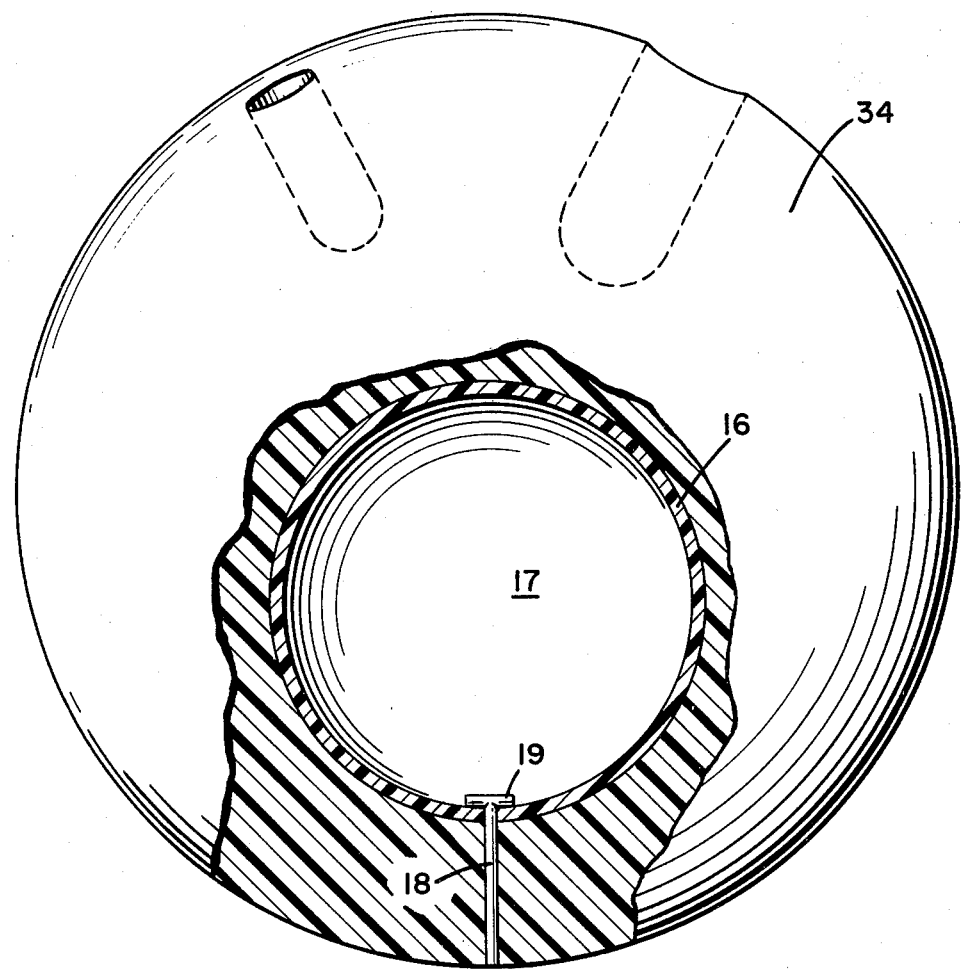
FIG. 6 is an elevation, partially in section, of a still further alternate embodiment of the bowling ball according to the present invention.

In the embodiment of a bowling ball illustrated in FIG. 6, a spherical hollow member 16 is disposed in body 34 of the ball with its centroid about 4.06 inches from the top of the ball. The ball has a diameter of 8.58 inches. The outside diameter of the member 16 is 4.14 inches and the density of the polymerizable mass of body 34 is such that the ball weighs 16 pounds. The polymerized mass is cured polyester resin containing kaolin clay and aminosilane coupling agent.

When the curing process is complete the mold may be ground away from the mass on the lathe which turns the ball down to its required circumference. When this is done, member 20 is removed but a portion of string 18 and member 19 remain in the ball. The diameter of string 18 is so small that it is substantially imperceptible on the surface of the bowling ball. Finger holes are cut into the ball in the area having the top weight or in other words where the mass concentration of the ball exists.

The ball so provided, according to any of the aforementioned embodiments, has an increased moment of inertia over a solid ball of a similar size and mass. The formula for the moment of inertia of a sphere is $m\, 2/5 r^2$ where r is the radius and m is the mass. The moment of inertia for a spherical shell may be calculated from the formula $$m\, 2/5\, \frac{(r_1^5 - r_2^5)}{(r_1^3 - r_2^3)}$$

with m being the mass $r_1$ the external radius of the sphere and $r_2$ the internal radius. The amount of inertia for the bowling ball is increased by about $2\frac{1}{2}\%$ over that of a uniformly solid bowling ball of 27 inches circumference when the hollow member has an external diameter of 2.68 inches and the density of the material used to cast the ball is such that the ball weight is 16 pounds.

While it has been found, therefore, that a ball with a lighter weight member therein provides a better hitting force, it has also been found that providing the ball with a weight opposed in location to the lighter weight material, affords still greater hitting power in certain situations. In addition, by varying the relative locations of the higher density material and the lower density material, a wide range of combinations of off center weight effects may be obtained.

Figure 7:
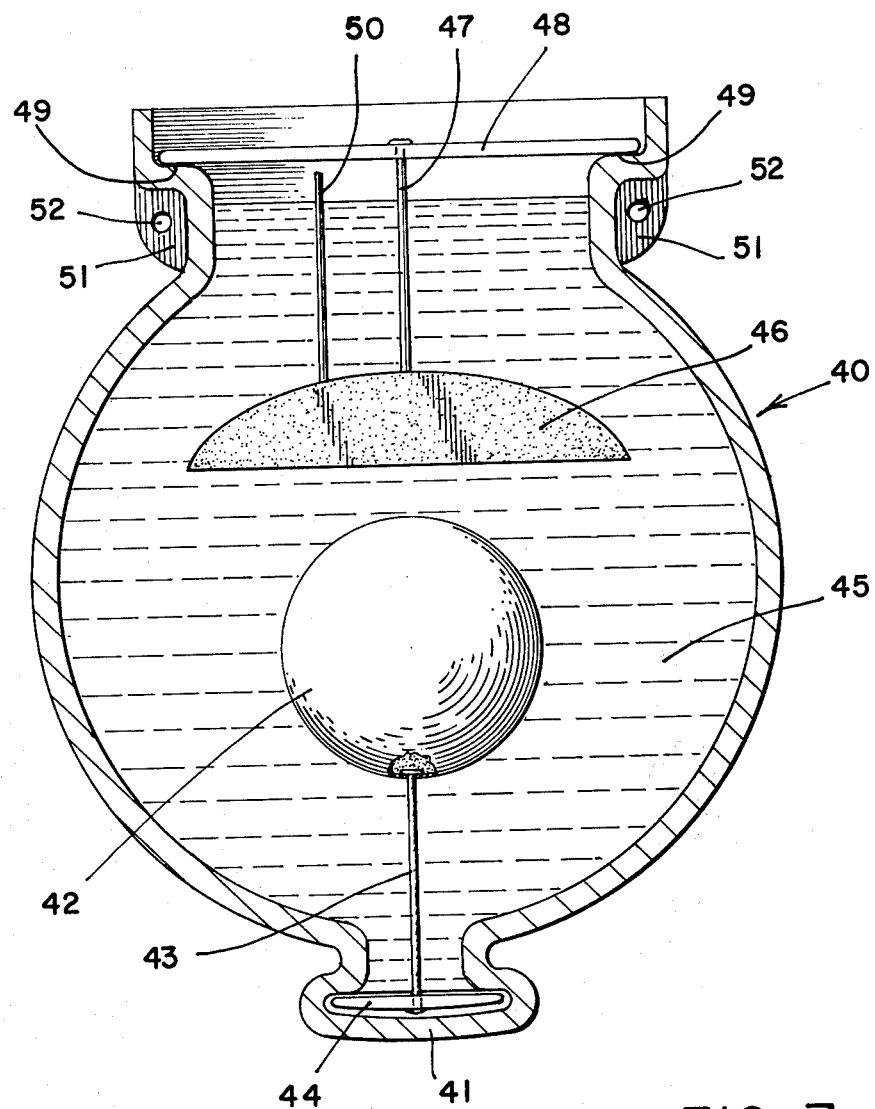
FIG. 7 is a cross-section of a mold and polymerizable mass illustrating another embodiment of the present invention.
Figure 8:
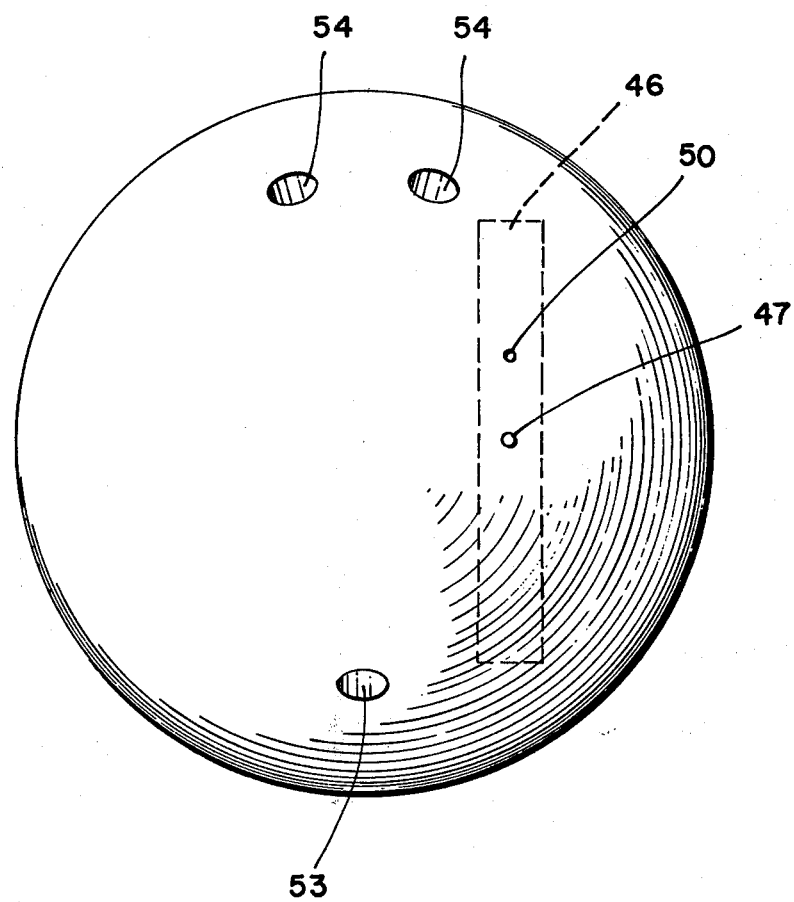
FIG. 8 is a somewhat schematic elevation of a drilled bowling ball manufactured according to the embodiment of FIG. 7.

One such example according to this concept is shown in the embodiment of FIGS. 7 and 8. There a mold 40, quite similar to mold 10, is made of a disposable plastic material such as polyethylene. Mold 40 is generally spherical of a size slightly larger than the approximate 8.5 inch diameter of a conventional bowling ball and includes a protuberance 41 at the bottom thereof. A member 42 of lesser specific gravity than the general mass of the bowling ball, such as polyethylene is selectively positioned within mold 40 by selecting the length of a nylon string 43 such as the buttoneer 18 of the previously described embodiments. String 43 is attached at one end to a resilient disk 44 which may be snapped into protuberance 41. The other end of string 43 is injected into member 42. While member 42 is preferably spherical so that when the mass cures, a uniform shrinkage occurs, it could well be hemispherical or take on any of the numerous shapes previously discussed. It can be hollow but is preferrably an impermeable polyethylene member. As shown in FIG. 7, the preferred member 42 is of approximately a three inch diamter. As such its volume is about 14 cubic inches; however, a member in the range of 0.5 to 200 cubic inches would be acceptable. As will hereinafter be discussed in more detail, it has been found that the centroid of member 42 may be positioned in the range of from three to six and one half inches from a surface of the eventual 8.5 inch bowling ball. As shown in FIG. 7, the reference surface would be the top with member 42 being shown in the approximate middle of the permissible range. The length of string 43 is preset to locate member 42 as desired.

After positioning member 42 in mold 40, a polymerizable mass 45 of specific gravity greater than member 42 is injected into the mold. The composition of the mass may be identical to that of the bowling balls of the previously described embodiments. Member 42 will then float to its desired position being constrained by string 43. A weight block 46 is then suspended in mold 40 to a predetermined depth. Weight block 46 is of a material having a higher specific gravity than mass 45, such as a resin like that of mass 45 mixed with barium sulfate, calcium carbonate or the like, and is suspended by a nylon pin 47 located at the center thereof. Pin 47 is held by a cross-member 48 which rests on an annular shoulder 49 of mold 40 and lies generally on an axis of the bowling ball. Pin 47 may be attached to cross-member 48 in any suitable fashion such as by extending up through a hole in cross-member 48, being bent over, and melted thereon.

The length of pin 47 can be preselected to position weight 46 within the ball as desired. As will hereinafter be discussed in more detail, it has been found that the top of weight 46 may be positioned in the range of from one-half inch to three and one-quarter inches from a surface of the ball. As shown in FIG. 7, this reference surface would be the top with the center of weight 46 being generally on the same axis of the bowling ball and the centroid of member 42.

Weight block 46 could take on a number of configurations. Conventionally these weight blocks are in the shape of a regular symetrical member such as a truncated cone or a cube. In these instances the "aspect ratio" of the member, which for purposes of this example can be defined as the ratio of a member's length to width when viewed in elevation, is unity. Thus, if the weight block were a truncated cone and, the portion thereof of decreasing diameter were suspended downwardly into the bowling ball, in elevation one would view a circle with an aspect ratio of unity. However, as shown in the embodiment of FIGS. 7 and 8, it has been found that a weight block with an aspect ratio of greater than unity provides unique roll characteristics. As best seen in FIG. 8 the rectangular elevational appearance of preferred weight block 46 has an aspect ratio of about 5.0. It has been found that this ratio could vary from a number greater than unity to about 15.0 and be within the spirit of this invention. However, a ratio of five to one in the longitudinal to transverse direction is preferred.

As shown in FIG. 7, from the side, weight block 46 preferably takes on the configuration of a segment of a circle and as previously described, is suspended by pin 47 from cross-member 48 at the center of mass thereof. A second or "dummy" locator pin 50 is also positioned in weight 46 which extends out of the mass 45 but is not connected to cross-member 48. Pin 50 is parallel to pin 47 and positioned along the longitudinal axis of weight 46 such that a line drawn between pins 47 and 50 would be parallel to the edges of weight block 46. As will hereinafter be described, this arrangement aids in the proper drilling of the bowling ball.

Mold 40 is also provided with ears 51 having openings 52 therein so that the mold may be suspended during curing, if desired. As in the previously described embodiments, if the cables which attach to openings 52 are tied together for a single point suspension, both member 42 and weight block 46 will be freely suspended in precise alignment.

With the weight block 46 and member 42 so positioned in the polymerizable mass 45, the mass is allowed to cure either with or without the heat or microwave acceleration, as previously described. After curing the product goes through a rough grind wherein the mold and burrs formed at protuberant member 41 and at the top open end of the mold are removed, thus leaving a generally spherical product. The product then goes through further fine grinding and buffing until the precise diameter for a conventional bowling ball is obtained.

The surface of the bowling ball will be of uniform color depending on the pigmentation selected but the ends of the two pins 47 and 50 will be evident as shown in FIG. 8. This is a guide for the craftsman skilled at drilling the finger and thumb holes in the ball. One advantage of the weight block having an aspect ratio of greater than unity is that the ball can be drilled so that it will roll in the direction of the larger dimension of the block. By observing the orientation of pins 47 and 50, the ball driller can determine how the weight block 46 is oriented and drill thumb hole 53 and finger holes 54 accordingly. The ball of FIG. 8 is shown as having been drilled to give a right handed bowler positive weight, that is, weight accentuating a hooking ball. If negative weight for a right handed bowler were desired, the weight block would be positioned on the other side of the finger and thumb holes. Obviously, reverse locations are true for a left handed bowler.

As previously described, the selectability in locating both the member 42 and weight block 46 render it possible to provide a bowling ball with a wide variety of eccentric weight conditions. For example, under one extreme, if a maximum amount of eccentricity and top weight were desired, the radially outer extent or top of weight block 46 could be located one-half inch from a point of reference on the surface of the ball and the member 42 located with its centriod six and one-half inches from the point of reference and on the same axis as the center of the weight block. At the other extreme, weight block 46 could essentially touch member 42 near the center of the ball to give some, but not extreme, eccentricity.

It should thus be evident that a bowling ball constructed according to the concept described herein accomplishes the objects of the invention and otherwise substantially improves the bowling ball art.

I claim:

1. A bowling ball comprising a spherical mass, a weight block having a higher specific gravity than said mass embedded in said mass, said weight block having a longitudinal axis, and means connected to said weight block and appearing on the outside surface of said mass to identify the location of the longitudinal axis of said weight block and to determine the depth of said weight block in said mass.

2. A bowling ball according to claim 1 wherein said means include at least two pin members connected to said weight block along the longitudinal axis thereof, the length of said pin members determining the depth of said weight block in said mass.

3. A bowling ball according to claim 2 wherein one of said pin members is located at the center of said weight block.

4. A bowling ball according to claim 1 wherein the ratio of the length of said weight block along its longitudinal axis to the width of the weight block is in the range of a minimum of greater than one and a maximum of fifteen to one.

* * * * *